(12) United States Patent
Alcazar

(10) Patent No.: US 6,482,346 B1
(45) Date of Patent: Nov. 19, 2002

(54) METHOD FOR MANUFACTURING AN IN-MOLD DISPLAY

(76) Inventor: Ross Alcazar, 1585 Chadwick Point Ct., Lawrenceville, GA (US) 30043

( * ) Notice: Subject to any disclaimer, the term of this patent is extended or adjusted under 35 U.S.C. 154(b) by 0 days.

(21) Appl. No.: 09/721,410

(22) Filed: Nov. 21, 2000

(51) Int. Cl.[7] .......................... B29C 45/14; B29C 70/70; B29C 70/72; B29C 70/84
(52) U.S. Cl. ............. 264/263; 264/272.15; 264/272.17; 264/277
(58) Field of Search ................................. 264/259, 246, 264/247, 263, 271.1, 272.11, 272.15, 275, 277, 272.14, 272.17

(56) References Cited

U.S. PATENT DOCUMENTS

| | | | |
|---|---|---|---|
| 4,350,654 A | * | 9/1982 | Yoshida ...................... 264/129 |
| 4,985,194 A | * | 1/1991 | Watanabe ................... 264/247 |
| 5,167,896 A | * | 12/1992 | Hirota et al. ............... 264/255 |
| 5,215,700 A | * | 6/1993 | Garganese .................. 264/250 |
| 5,227,222 A | * | 7/1993 | Ogawa et al. .............. 428/195 |
| 5,399,502 A | | 3/1995 | Friend et al. |
| 5,604,006 A | | 2/1997 | Ponchaud et al. |
| 5,795,525 A | * | 8/1998 | Naritomi .................... 264/251 |
| 5,980,400 A | | 11/1999 | Schickert |
| 6,042,905 A | | 3/2000 | Lingart et al. |
| 6,045,744 A | | 4/2000 | Kobayashi et al. |
| 6,054,087 A | | 4/2000 | Noirot et al. |
| 6,096,479 A | | 8/2000 | Kawamura |
| 6,102,686 A | | 8/2000 | Eschenfelder |
| 6,117,384 A | | 9/2000 | Laurin et al. |
| 6,130,646 A | | 10/2000 | Jang |
| 6,216,329 B1 | * | 4/2001 | Kaga et al. ................... 29/458 |
| 6,255,587 B1 | * | 7/2001 | Lambert et al. ........... 174/52.2 |

* cited by examiner

Primary Examiner—Angela Ortiz

(57) ABSTRACT

A method for combining a display and housing unit for any multiple component display device. The housing unit has a display which is embedded into the material of the housing unit during the injection molding process of the housing unit. The display is inserted into a mold cavity that has a surface that is compatible with the three-dimensional shape of the display. A mold core is then aligned with the mold cavity and molten resin in injected into the space created by the mold cavity and mold core. Once the molten resin hardens, the display is permanently fixed and bonded into the housing unit. This method reduces both the component count and manufacturing costs involved in device assembly.

9 Claims, 4 Drawing Sheets

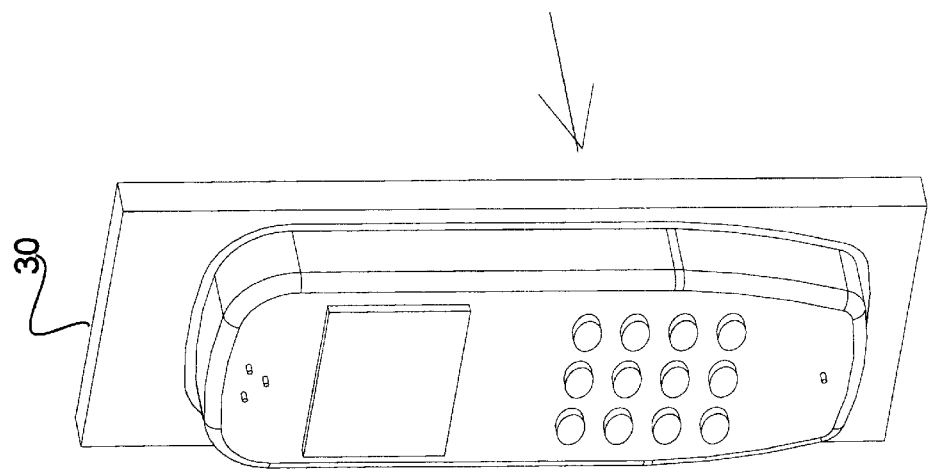
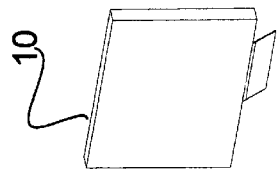
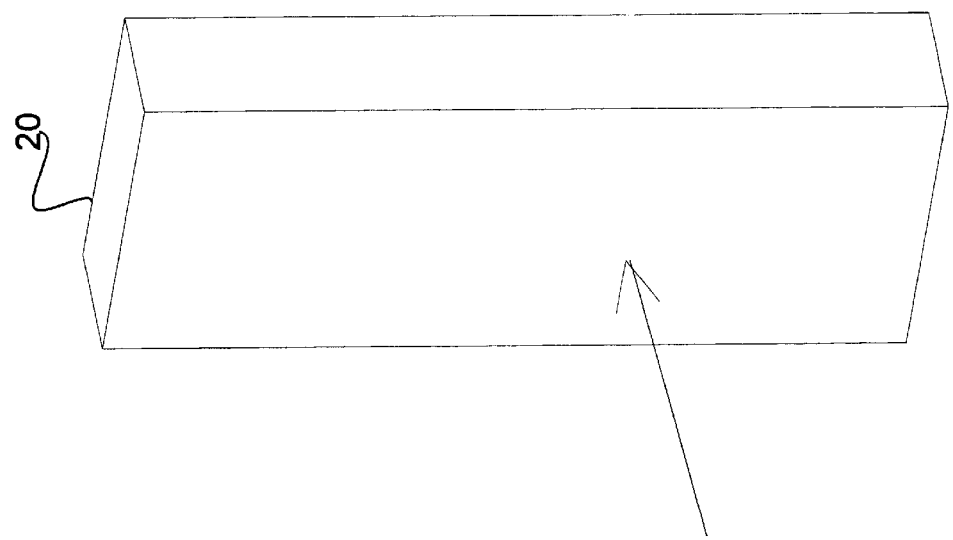
FIG. 2

METHOD FOR MANUFACTURING AN IN-MOLD DISPLAY

BACKGROUND OF THE INVENTION

The present invention relates generally to a display and housing unit for any multiple component display assembly and, more particularly, a single piece in-mold display and housing unit which reduces the component count and cost of any device that utilizes a display in an enclosed assembly.

A significant number of electronic devices in use today, such as, but not limited to computer monitors, cellular and PCS telephones, internet appliances, personal digital assistants (PDAs), home audio equipment, video cassette recorders, kitchen appliances feature multiple component displays. Multiple component displays are display devices that are composed of an internal display sub-assembly that may include various discreet component parts in addition to the simple display itself and in-turn is housed within some type of enclosure. The multiple component displays being used today are assembled as separate sub-components that are then joined together, with the other components of the electronic device, into a final assembly. Unfortunately, the manufacture of the electronic devices with these multiple component displays involve many distinct assembly steps and are usually too complex to be performed by machinery, and hence, requiring human operator interaction. For example, a cellular/PCS telephone handset usually includes a multiple component display sub-assembly consisting of a front cover housing, a lens, a liquid-crystal display (LCD) and or light-emitting diode display (LED), and various fastening components such as screws and/or adhesive gaskets, etc. These various pieces of the multiple component display must be arranged into the appropriate order and bound together, via the screws and/or adhesive gaskets into a sub-assembly that is then attached via screws, snaps, adhesive gaskets, or is welded or soldered to the printed circuit board (PCB) and then is assembled into the cellular/PCS telephone handset.

Alternative methods of assembling the electronic devices involve the use of fastening features, such as snaps, interference bosses, ultrasonic welding features, etc., which are incorporated onto the molded housing. These fastening features are then used during the assembly process to fasten the multiple component display to the enclosure. Yet another method for assembling of the electronic devices involve the fastening of the multiple component display between two enclosure covers which are bound together using screws, adhesives, ultrasonic welding, etc.

A major disadvantage of currently available methods for assembling the electronic devices with the multiple component display is the high cost associated with such methods. Part of the high assembly cost is incurred by the large number components used by these methods. The assembly process itself is also costly, since it is made unnecessarily complex due to the large number of separate manufacturing steps involved in the application of these methods.

The large number of component parts and the complex assembly processes involved with the currently available methods for fastening the multiple component display to the final enclosure continues to drive the manufacturers of these devices to find ways to reduce component count and assembly complexity. The new ways of assembling component display must not only reduce assembly costs (by reducing component count and assembly complexity), but they must be sufficiently flexible in order to permit the assembly of new types of component displays as they themselves continue to be designed and developed.

SUMMARY OF THE INVENTION

The present invention is directed to provide a combined display and housing unit for any electronic device that utilizes a component display and multiple housing components. The method comprises the steps of:

(1) providing a display constructed of any display substrate material, for example, glass, polycarbonate film, nylon film;

(2) optionally, discreet or embedded electronic components, for example, resistors, drivers, capacitors, inductors may be soldered onto said display;

(3) inserting said display into a mold having a surface which matches the three-dimensional shape of said display substrate; and (4) injecting a molten resin, for example, polycarbonate, ABS, silicon rubber, or magnesium into said mold through a plurality of gates behind said display to produce a one-piece, permanently bonded three-dimensional product suitable for use in electronic devices.

The disclosed process eliminates the need for assembling a component display into a discrete component that is in turn fastened to a component housing unit via adhesives, snaps, clips, welds, or solder. By molding the display substrate directly into the component housing unit, the steps involved in combining the component display with the component housing unit are eliminated. Additionally, the permanent fusing of the display and the component housing unit results in a single unit that is both mechanically and chemically more reliable and robust than a comparable unit that is joined via some bonding process.

It is the object of the present invention to provide a method for reducing both the component count and the assembly complexity involved in the assembly of electronic devices with displays.

It is another object of the present invention to produce a single unit comprising of a display and a component housing unit that is both mechanically and chemically more robust and a comparable unit formed by simply bonding such elements.

It is yet another object of the present invention to permit rapid design changes to the display used in an electronic device without requiring significant changes to be made to the design of the component housing unit.

Other objects, features and advantages of the present invention will become apparent upon reading and understanding the present specification, when taken in conjunction with the accompanying drawings.

BRIEF DESCRIPTION OF THE DRAWINGS

FIG. 2 is a diagram depicting an alternate view of the diagram shown in FIG. 1.

DETAILED DESCRIPTION OF THE PREFERRED EMBODIMENTS

Figure 1:
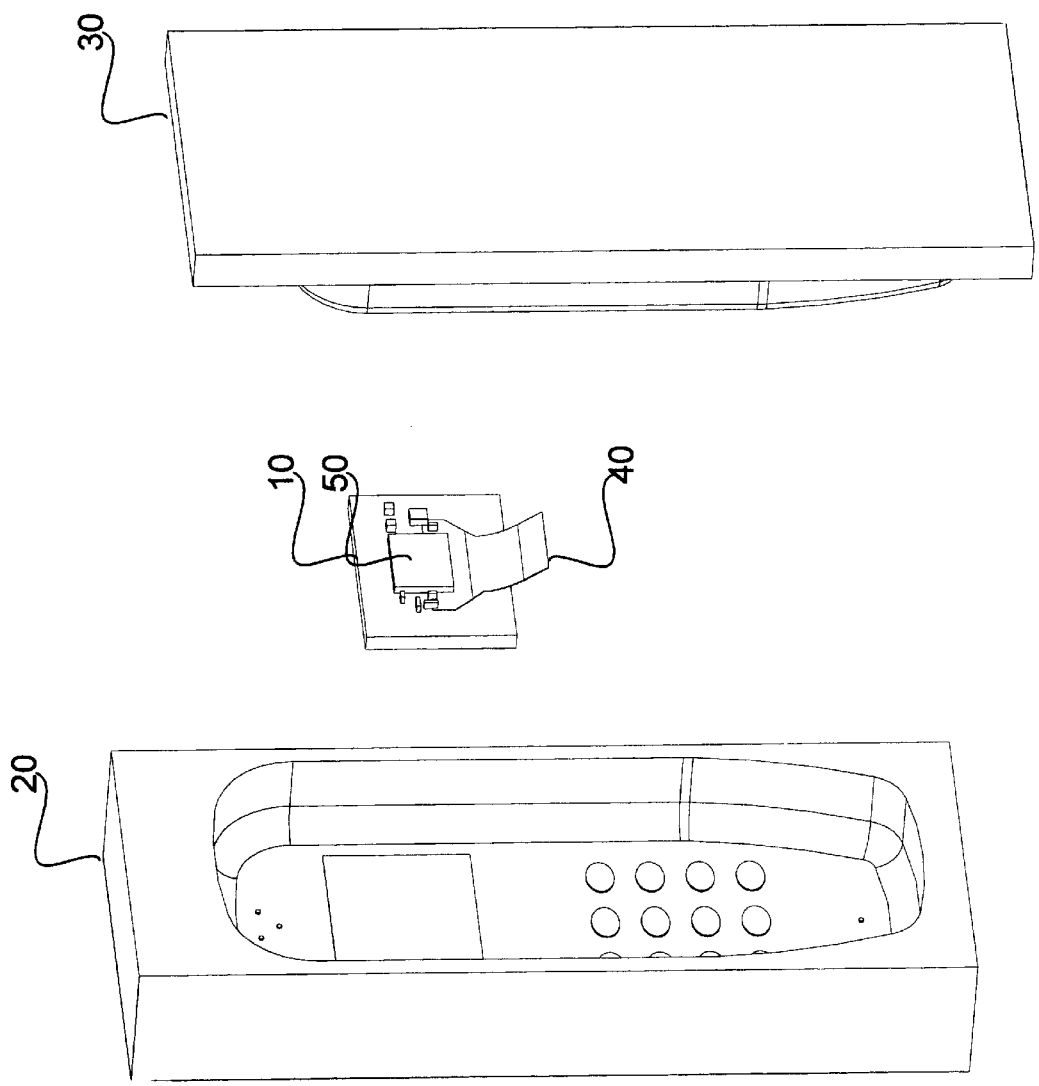
FIG. 1 is a diagram depicting a display for an electronic device being inserted into a mold used for forming a component housing unit of the electronic device.

Reference is now made to the drawings, and those embodiments of the invention here presented by way of illustration, wherein like reference numerals designate corresponding parts throughout the several figures.

Perhaps the most efficient and cost-effective way of assembling a multiple component display into an injection molded component housing unit is to assemble it during the actual injection molding of the component housing unit. A way to accomplish this is by inserting the multiple component display into a specially designed cavity in a molding tool and then injecting the molten component housing unit material into the molding tool. This process is referred to as in-mold displays. In-mold displays can provide a number of advantages over other assembly techniques, such as, (i) in-mold displays can provide product differentiation for consumer applications, (ii) multiple component displays can be molded and merged in one operation, (iii) complex multiple component display structures, such as three-dimensional displays or light-emitting polymers (LEP), can be molded in one operation, (iv) processing, assembly, and labor costs can be reduced, and (v) component count can be reduced and electrical termination to an electronic device's circuit board can be simplified.

Referring now to FIG. 1, which is a diagram depicting a display 10 as it is being inserted into a mold cavity 20. The mold cavity 20 has, engraved onto its surface, features that match the three-dimensional shape of the display 10. A mold core 30 is then mated with the mold cavity 20 and some molten resin is injected into the mold. The molten resin may be, but is not limited to polycarbonate, ABS, silicon rubber, or magnesium. The display 10 itself may optionally contain a flexible termination membrane 40 or other embedded electronic components 50 such as resistors, inductors, capacitors, transistors, drivers, or integrated circuits. Additionally, the display 10 itself may be fabricated by any such method or use any currently available display technology, such as, but not limited to liquid-crystal displays (LCD) with or without backlighting on a glass substrate including indium tin oxide (ITO) traces and optionally a chip on glass (COG) driver, light-emitting diodes (LED) with or without backlighting on a flexible polymer substrate or a printed circuit board, light-emitting polymers (LEP) on a flexible polymer substrate as described in U.S. Pat. No. 5,247,190. The display 10 may also be purchased from some supplier and be delivered to the manufacturer in a ready-to-use state.

FIG. 2 depicts an alternate view of the diagram shown in FIG. 1. FIG. 2 provides a more detailed view of the mold core 30. The mold core 30 is used to form the detail side of the component housing unit. Once the display 10 is inserted into the mold cavity 20 and the mold core 30 is brought into alignment with the mold cavity 20, the molten component housing unit material is injected into the empty volume created by the mold cavity 20 and the mold core 30. The molten material flows around the display 10 to encapsulate the display 10 inside the component housing unit.

Figure 3:
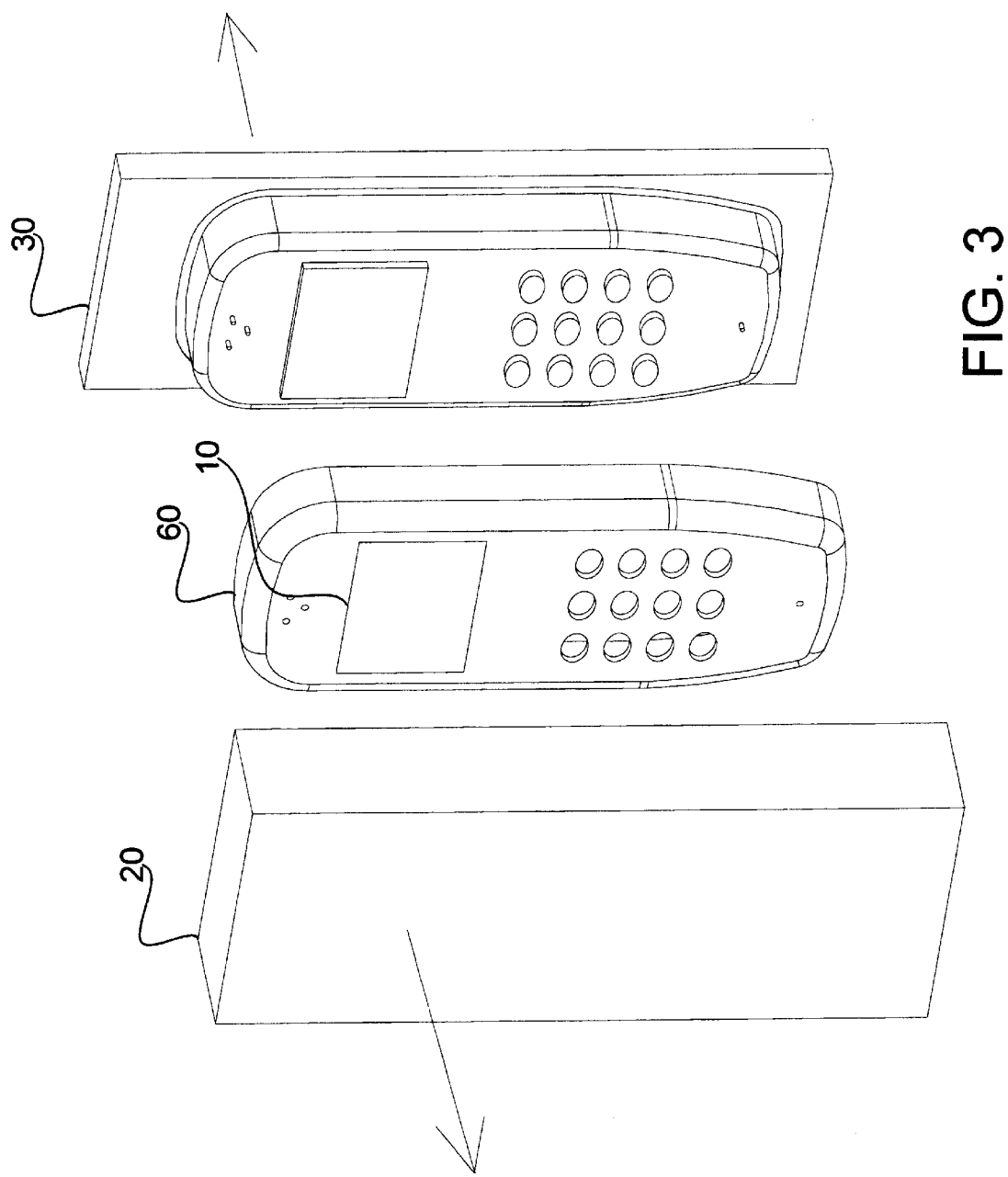
FIG. 3 is a diagram depicting a component housing unit, containing an embedded display after the molten material injected into the mold has hardened.

Refer now to FIG. 3 for a diagram depicting a component housing unit 60 and the mold cavity 20 and mold core 30. Once the injected resin has hardened, the mold cavity 20 and the mold core 30 are separated and the component housing unit 60 containing the embedded display 10 is ejected from the mold. The component housing unit 60 is complete and is ready for further assembly into a completed electronic device.

Figure 4:
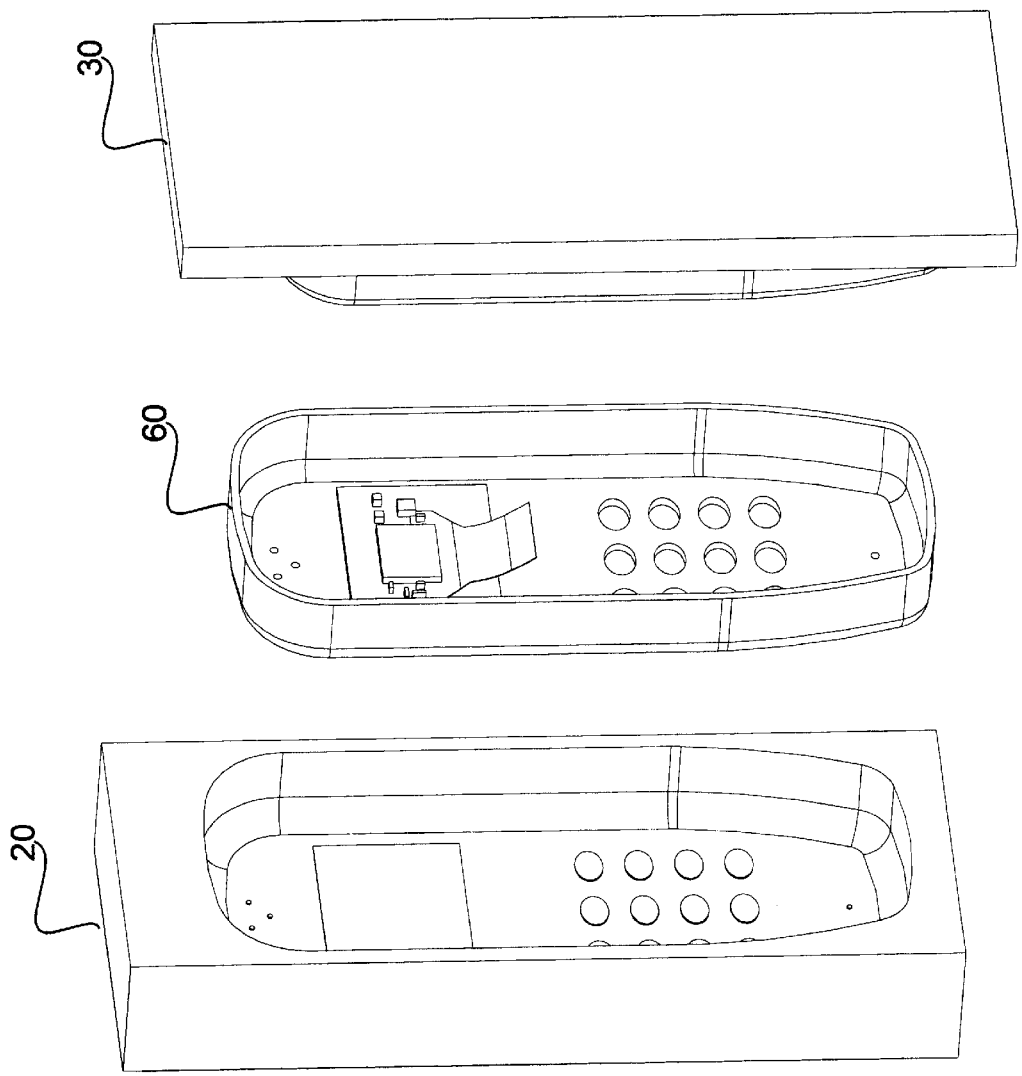
FIG. 4 is a diagram depicting an alternate view of the diagram shown in FIG. 3.

FIG. 4 depicts an alternate view of the diagram shown in FIG. 3. FIG. 4 provides a more detailed view of the back side of the component housing unit 60, showing the display 10 as it is embedded inside the component housing unit 60.

While the embodiments of the present invention which have been disclosed herein are the first preferred forms, other embodiments of the method and apparatus of the present invention will suggest themselves to persons skilled in the art in view of this disclosure. Therefore, it will be understood that variations and modifications can be effected within the spirit and scope of the invention and that the scope of the present invention should not be limited to the specific details disclosed herein.

I claim:

1. A process for producing an in-mold display comprising the steps of:

Providing a display having a three dimensional shape, wherein said display is a liquid crystal display, a visible light-emitting diode, a visible light-emitting diode soluble semi-conducting polymer device, a visible light-emitting diode soluble semi-conducting dendrimer device, a visible light-emitting small molecule fluorescent device, a light-emitting small molecule phosphorescent device, an organic electroluminescent device, an encapsulated elcetrophoretic device, or an organic light-emitting diode (OLED) display, wherein said display may include a plurality of discrect electronic component; providing a mold cavity having features engraved on its surface that match the three dimensional shape of the display; inserting said display into said mold cavity; aligning said cavity with a mold core, said core forming a detail side of a component housing unit; and injecting a molten resin into space formed by said mold cavity and said mold core, wherein said molten resin flows around the display and forms the component housing unit, and when hardened, encapsulates and permanently bonds said display.

2. A process according to claim 1 wherein said display is a multiple component display.

3. A process according to claim 1 wherein said display contains a display backlight.

4. A process according to claim 1 wherein said display is manufactured on flexible polymer film.

5. A process according to claim 1 wherein said display includes a flexible termination membrane.

6. A process according to claim 1 wherein said molten resin is selected from the group consisting of polycarbonate, ABS, silicon rubber, acrylic, and magnesium.

7. An article of manufacture produced by the process of claim 1.

8. A process according to claim 1 wherein said display is manufactured on glass.

9. A process according to claim 1 wherein said display is manufactured on silicon.

* * * * *